(12) United States Patent
Baker et al.

(10) Patent No.: US 10,906,189 B1
(45) Date of Patent: *Feb. 2, 2021

(54) SENSOR SYSTEMS AND METHODS FOR SEWN PRODUCT PROCESSING APPARATUS

(71) Applicant: SoftWear Automation Inc., Cumming, GA (US)

(72) Inventors: Michael J. Baker, Acworth, GA (US); Barrett C. Clark, Seattle, WA (US); Eric Guenterberg, Watertown, MA (US); Alexander Ren Gurney, Atlanta, GA (US)

(73) Assignee: SoftWear Automation Inc., Cumming, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,297

(22) Filed: Jul. 24, 2020

Related U.S. Application Data (63) Continuation of application No. 16/681,588, filed on Nov. 12, 2019, now Pat. No. 10,744,647.

(51) Int. Cl.
| | |
|---|---|
| *D05B 23/00* | (2006.01) |
| *B25J 9/16* | (2006.01) |
| *D05B 69/30* | (2006.01) |
| *D05B 19/12* | (2006.01) |
| *D05B 19/10* | (2006.01) |

(52) U.S. Cl.
CPC .......... *B25J 9/1697* (2013.01); *B25J 9/1602* (2013.01); *D05B 19/10* (2013.01); *D05B 19/12* (2013.01); *D05B 69/30* (2013.01)

(58) Field of Classification Search
CPC ........ D05B 23/00; D05B 19/10; D05B 19/16; D05B 27/08; G01B 11/005; B25J 9/1697
USPC ....................................... 112/470.04, 470.09
See application file for complete search history.

(56) References Cited

U.S. PATENT DOCUMENTS

| | | | | |
|---|---|---|---|---|
| 4,632,046 A | * | 12/1986 | Barrett ................... | D05B 33/00 112/304 |
| 6,220,687 B1 | * | 4/2001 | Takahashi .............. | A41H 3/007 347/5 |
| 8,256,363 B2 | * | 9/2012 | Tokura ................... | D05B 19/10 112/102.5 |
| 8,997,670 B2 | * | 4/2015 | Book ..................... | D05B 27/08 112/318 |
| 9,551,099 B2 | * | 1/2017 | Suzuki .................. | D05B 19/08 |

(Continued)

*Primary Examiner* — Tajash D Patel
(74) *Attorney, Agent, or Firm* — Thomas | Horstemeyer, LLP

(57) ABSTRACT

Due to rapid advancement in computing technology of both hardware and software, the labor intensive sewing process has been transformed into a technology-intensive automated process. During an automated process, processing of a work piece can be visually monitored using a sensor system. Data gathered from the sensor system can be used to infer the condition and/or position of the work piece in the work area using, e.g., models of a sensor profile. Evaluation can be carried out before processing begins, during processing and/or after processing of the work piece. Examples of systems and methods are described that provide for initially and successively matching the model of the expected shape for a product work piece to a set of sensor readings of the work piece in order to determine the position of the work piece and support a variety of useful features.

20 Claims, 5 Drawing Sheets

(56) References Cited

U.S. PATENT DOCUMENTS

| | | | | |
|---|---|---|---|---|
| 10,744,647 | B1* | 8/2020 | Baker | D05B 19/10 |
| 2011/0282479 | A1* | 11/2011 | Tokura | D05B 19/12 |
| | | | | 700/108 |
| 2014/0277683 | A1* | 9/2014 | Gupta | A41H 3/007 |
| | | | | 700/132 |
| 2017/0260670 | A1* | 9/2017 | Freer | B25J 11/00 |
| 2019/0353476 | A1* | 11/2019 | Takeda | G01B 11/2513 |

* cited by examiner

FIG. 5

SENSOR SYSTEMS AND METHODS FOR SEWN PRODUCT PROCESSING APPARATUS

CROSS REFERENCE TO RELATED APPLICATIONS

This application claims priority to, and the benefit of, co-pending U.S. non-provisional application entitled "Sensor Systems and Methods for Sewn Product Processing Apparatus" having Ser. No. 16/681,588, filed Nov. 12, 2019, the entirety of which is hereby incorporated by reference.

FIELD OF THE DISCLOSURE

The present disclosure is generally related to systems, apparatuses, and methods that cut and/or sew a product and, more particularly, is related to systems, apparatuses, and methods that determine the location of a workpiece within a work area.

BACKGROUND

A common challenge in automating more complex processes in sewn product manufacturing is that the apparatus, such as a sewing robot, must determine the location of a sewn product work piece within the sewing robot work area. There has been a limitation in the art of tracking the work piece, for example a sewn product such as material, fabric, or textile, throughout the automated sewn product process. Also, it is difficult to determine capabilities of the sewn product process apparatus and the steps that need to be taken in order to successfully create the desired product.

The value of this concept is that through captured sensor data the system can apply models of sensors as well as models of robot system to guide the robot system as well as determine if the process being performed by the sewn product making apparatus is acceptable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

BRIEF DESCRIPTION OF THE DRAWINGS

The accompanying drawings illustrate various examples of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles. Moreover, in the drawings, like reference numerals designate corresponding parts throughout the several views.

DETAILED DESCRIPTION

Disclosed herein are various examples related to vision system which can be used for automation of sewing. Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems, and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
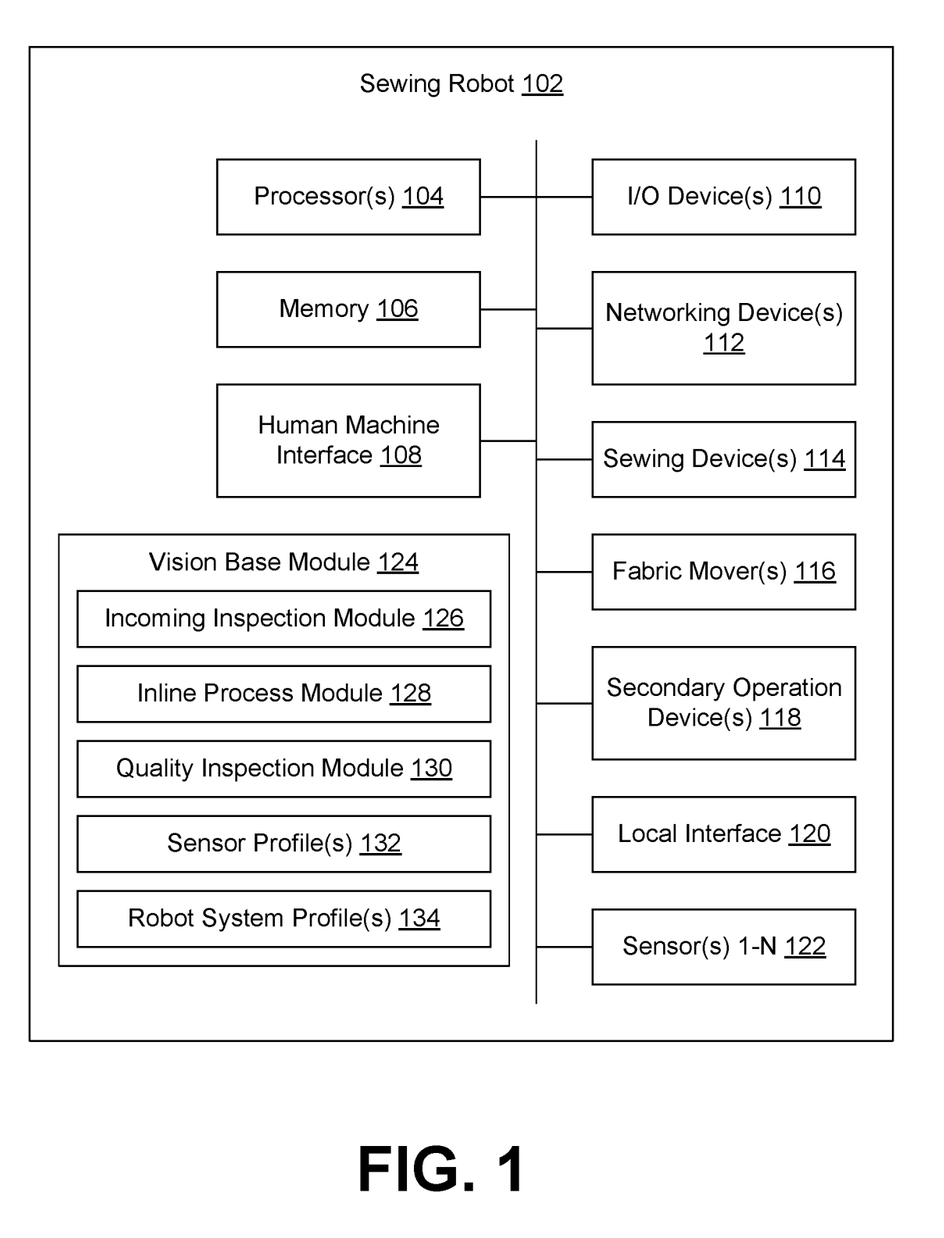
FIG. 1 illustrates an example of a vision system, according to various embodiments of the present disclosure.

Referring to FIG. 1, shown in an example of a sewing robot 102. As illustrated in the example of FIG. 1, the sewing robot 102 can comprise a processor 104, memory 106, a human machine interface or HMI 108, input/output (I/O) devices 110, networking device(s) 112, sewing device 114, fabric mover(s) 116, secondary operation device(s) 118, local interface 120, and sensors 122 (e.g., RGB camera, RGB-D camera, NIR camera, etc.). The sewing robot 102 can also include a vision base module 124, an incoming inspection module 126, inline process module 128, and/or quality inspection module 130 which may be executed to implement various aspects of a vision system.

The vision base module 124 can initiate the incoming inspection module 126, inline process module 128, and quality inspection module 130. The incoming inspection module 126 can capture sensor data prior to any actions performed by the sewing robot 102 to determine the position of a work piece in a work area of the sewing robot 102 by comparing the results with sensor profile(s) 132 and robot system profile(s) 134. The inline process module 128 can capture sensor data while actions are being performed by the sewing robot 102 to determine the position of the work piece in the work area by comparing the results with sensor profile(s) 132 and robot system profile(s) 134. The quality inspection module 130 can capture sensor data after the actions are performed by the sewing robot 102 to determine the quality of the sewn piece in the work area by comparing the results with sensor profile(s) 132 and robot system profile(s) 134.

The processor 104 can be configured to decode and execute any instructions received from one or more other electronic devices or servers. The processor 104 can include one or more general-purpose processors (e.g., INTEL® or Advanced Micro Devices® (AMD) microprocessors) and/or one or more special purpose processors (e.g., digital signal processors or Xilinx® System On Chip (SOC) field programmable gate array (FPGA) processor). The processor 104 may be configured to execute one or more computer-readable program instructions, such as program instructions to carry out any of the functions described in this description. Processing circuitry including the processor 104 can be configured to execute one or more computer-readable program instructions, such as program instructions to carry out any of the functions described in this description.

The memory 106 can include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions. The memory 106 can comprise modules that can be implemented as a program executable by processor(s) 104.

The interface(s) or HMI 108 can either accept inputs from users or provide outputs to the users or may perform both the actions. In one case, a user can interact with the interfaces using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interfaces can either be implemented as a command line interface (CLI), a human machine interface (HMI), a voice interface, or a web-based user-interface, at element 108.

The input/output devices or I/O devices 110 of the sewing robot 102 can comprise components used to facilitate connections of the processor 104 to other devices such as, e.g., a knife device, sewing device 114, fabric mover(s) 116, secondary operation device(s) 118, and/or sensor(s) 122 and therefore, for instance, can comprise one or more serial, parallel, small system interface (SCSI), universal serial bus (USB), or IEEE 1394 (i.e. Firewire™) connection elements.

The networking device(s) 112 of the sewing robot 102 can comprise various components used to transmit and/or receive data over a network. The networking device(s) 112 can include a device that can communicate both inputs and outputs, for instance, a modulator/demodulator (i.e. modem), a radio frequency (RF) or infrared (IR) transceiver, a telephonic interface, a bridge, a router, as well as a network card, etc.

The sewing device 114 of the sewing robot 102 can facilitate sewing the work piece material(s) together and can be configured to sew a perimeter or along markings on the work piece material based on tracking a generated pattern. In additional embodiments, the sewing device 114 can include a knife device in order to cut threads, stitches, materials from the work piece etc. The fabric mover(s) 116 or material mover(s) can facilitate moving the product material(s) during the cutting and sewing operations, at element 116. The secondary operation device(s) 118 can include stacking device(s), folding device(s), label manipulation device(s), and/or other device(s) that assist with the preparation, making and/or finishing of the sewn product.

The local interface 120 of the sewing robot 102 can be, for example, but not limited to, one or more buses or other wired or wireless connections, as is known in the art. The local interface 120 can have additional elements, which are omitted for simplicity, such as controllers, buffers (caches), drivers, repeaters, and receivers, to enable communications. Further, the local interface 120 can include address, control, and/or data connections to enable appropriate communications among the components, at element 120.

The sensor(s) 122 of the sewing robot 102 can facilitate detecting the position and movement of the work piece material(s). A system including one or a plurality of sensors 122 can be used such as, but not limited to, motion sensors, temperature sensors, humidity sensors, cameras such as a RGB camera, an RGB-D camera, a stereoscopic camera, a near infrared (NIR) camera, or other image capture devices, microphones, radiofrequency receiver, a thermal imager, a radar device, a lidar device, an ultrasound device, a speaker, wearable devices etc., at element 122. The RGB-D camera is a digital camera that can provide color (RGB) and depth information for the pixels in an image. In some embodiments, a single sensor 122 can function to provide a variety of sensing activities.

As shown in FIG. 1, the sewing robot 102 includes a vision base module 124 which can initiate the incoming inspection module 126, inline process module 128, and quality inspection module 130. The incoming inspection module 126 can capture sensor data after it enters the workspace of the sewing robot 102 to determine the position of a work piece in the work area by comparing the results with sensor profile(s) 132 and robot system profile(s) 134. The inline process module 128 can capture sensor data while actions are being performed by the sewing robot 102 to determine the position of the work piece in the work area by comparing the results with sensor profile(s) 132 and robot system profile(s) 134. The quality inspection module 130 can capture sensor data after the actions are performed by the sewing robot 102 to determine the position of the work piece in the work area by comparing the results with sensor profile(s) 132 and robot system profile(s) 134. The quality inspection module 130 can also evaluate other conditions of the work piece.

A sensor profile 132 can be a precomputed sensor model and parameters, such as a model of a detected shape of a sewn product work piece that can be used in order to process sensor readings and estimate the position of a work piece in a work area by comparing the model of the detected shape to a model of the expected shape. For example, a mathematical model of a curve of a work piece where the curve can be defined as a set of two (or more) points in two (or more) dimensions such as a semi-circle curve, right angle curve, etc. The sensor profile 132 can include criteria such as, e.g., characteristics, parameters and/or tolerances that can be used for evaluation of a work piece and/or product by, e.g., comparison with sensor data of the work piece or product. In various embodiments, this can be a precomputed camera model that determines, e.g., the size of a work piece, curve of a work piece, irregularities in the work piece, area of the work piece, thread parameters of a work piece, stitch type of a work piece, sewn path of a work piece, and/or size of the finished work piece, to name a few, at element 132.

A robot system profile 134 can comprise precomputed parameters or limitations of the robot system 102 such as, e.g., maximum or minimum size of a work piece, curve sewing capabilities of the robot system, irregularities that can be handled by the robot system, if the work piece moves outside of the usable work area for the sewing robot 102, thread capabilities of the robot system, stitch capabilities of the robot system, quality checks of the finished work piece such as the sewn path and size of the work piece, to name a few, at element 134. The robot system profile 134 can include criteria such as, e.g., characteristics, parameters, tolerances and/or capabilities that can be used for evaluation of a work piece and/or product by, e.g., comparison with sensor data of the work piece or product.

Functioning of the vision base module 124 will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
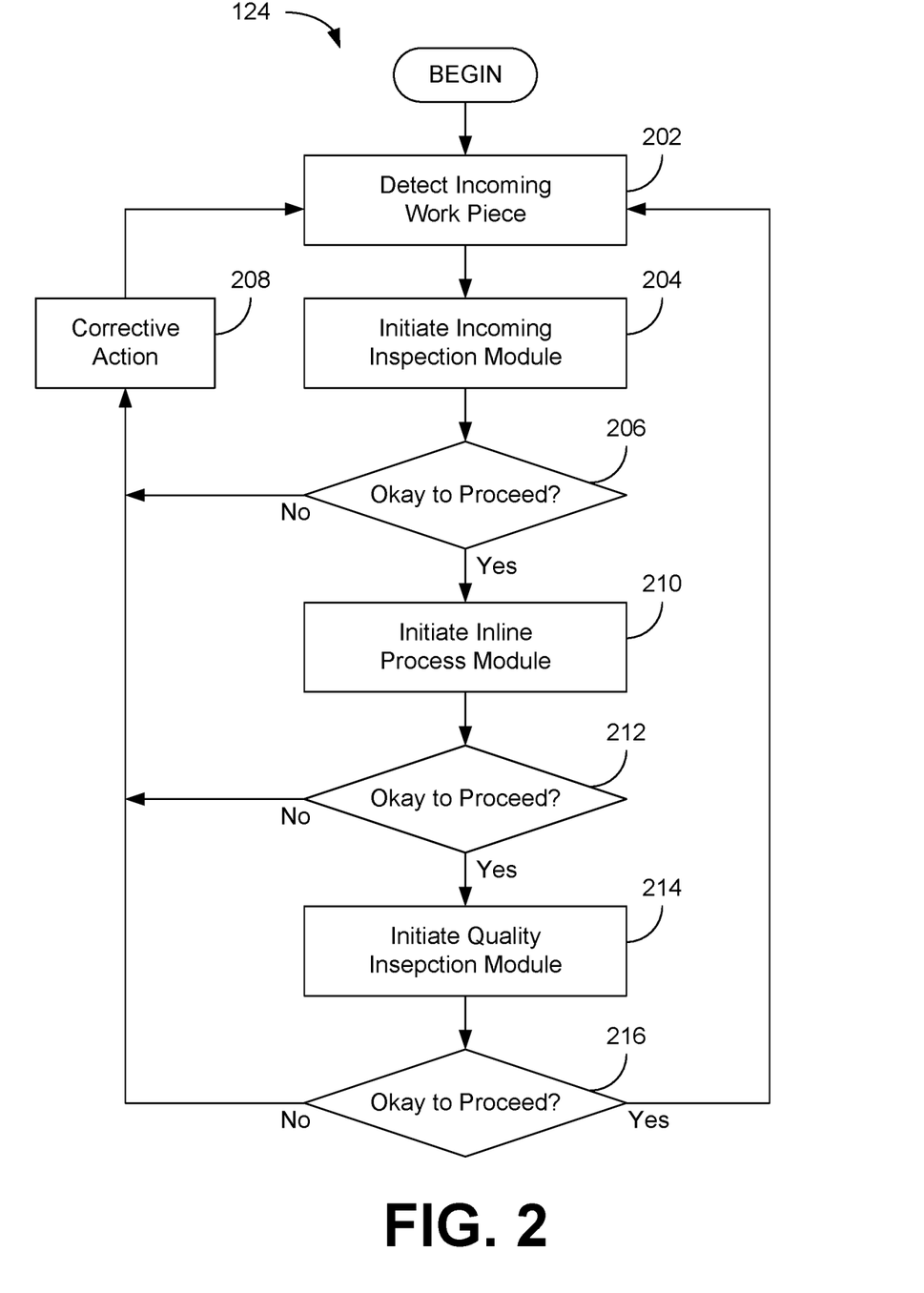
FIG. 2 illustrates an example of a vision base module, according to various embodiments of the present disclosure.

The flow chart of FIG. 2 shows the architecture, functionality, and operation of a possible implementation of the vision base module 124. The process begins at 202 with the vision base module 124 detecting an incoming work piece being placed on the work table. The vision base module 124 can initiate the incoming inspection module 126 at 204, which captures sensor data, compares the sensor data to a sensor profile 132, which can be precomputed, and a robot system profile 134. If it has been determined at 206 that the work piece does not meet specified model characteristics, parameters and/or capabilities of the robot system then the process continues to 208 where a corrective action can be taken to address the failure to meet the characteristics, parameters or capabilities, and the process can return to 202 to detect the next work piece. In some cases, the process may be stopped while the corrective action is taken. Corrective actions at 208 can include, but are not limited to, repositioning the work piece using fabric mover(s) 116, automatically removing the unacceptable work piece from the sewing robot 102 work flow, which can be carried out by fabric mover(s) 116 of the sewing robot 102, or stopping the sewing robot 102 until an operator takes an appropriate action (e.g., manually removing the unacceptable work piece) and restarting the process. The process can be restarted (either automatically or manually) after the corrective action is complete at 208.

If the work piece has been deemed adequate or acceptable for further processing at 206, then the process can continue to 210 where the vision base module 124 can initiate the inline process module 128. At 210, the inline process module 128 can capture sensor data during processing of the work piece, and compare the sensor data to the sensor profile(s) 132 (FIG. 1) associated with the sensor data, which can then be compared to the robot system profile(s) 134 (FIG. 1). The inline process module 128 can adjust operation of the sewing robot 102 during processing of the work piece to maintain the processing within acceptable guidelines associated with the work piece. For example, sewing along defined seam lines can be continuously or iteratively adjusted during the inline process to maintain the finished product within production tolerances. If the inline process fails to meet specified model characteristics, parameters and/or capabilities, then the work piece can be considered inadequate or unacceptable and/or the inline process is not complete at 212. In that case, corrective action can be taken at 208 as previously discussed, before returning to 202 to detect the next work piece.

If the work piece has been deemed adequate or acceptable, and the inline process is complete at 212, then the vision base model 124 can initiate the quality inspection module 130 at 214. The quality inspection module 130 can capture sensor data, and compare the sensor data to the sensor profile(s) 132 and the robot system profile(s) 134. If it has been determined at 216 that the work piece does not meet specified model characteristics, parameters and/or capabilities then corrective action can be taken at 208 as previously discussed, before returning to 202 to detect the next work piece. However, if the work piece has been deemed adequate or acceptable at 216, then the process can return to 202 to repeat the vision base module 124.

It should be noted that these modules are interchangeable and may be used in a different order or different combinations than the one provided in this example. For instance the quality inspection module 130 and/or inline process module 128 may be initiated by the vision base module 124 more than once to ensure the quality of the sewn product between various sewing stages during the manufacturing process. Also, various implementations can initiate only one or a reduced combination of the modules illustrated in FIG. 2. The incoming inspection module 126 can be initiated, followed by one or neither of the inline process module 128 and/or the quality inspection module being initiated. Similarly, the incoming inspection module 126 can be bypassed after detecting an incoming work piece, and one or both of the inline process and/or the quality inspection modules can be initiated. Other combinations are also possible as can be appreciated.

Functioning of the incoming inspection module 126 will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
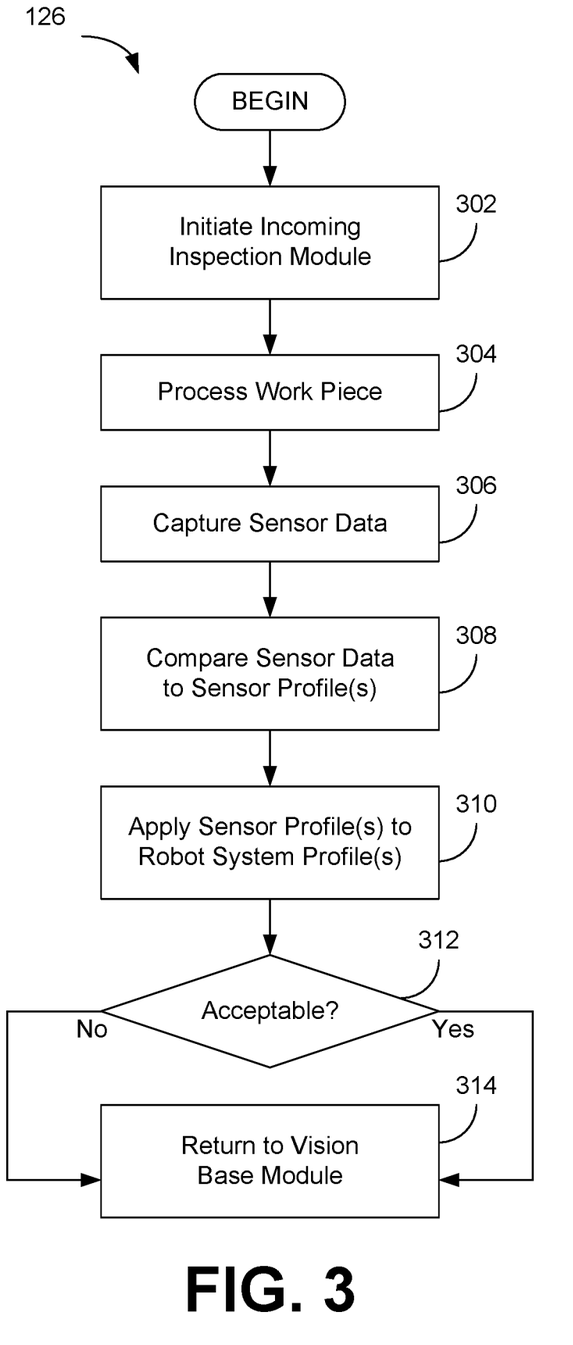
FIG. 3 illustrates an example of an incoming inspection module, according to various embodiments of the present disclosure.

The flow chart of FIG. 3 shows the architecture, functionality, and operation of a possible implementation of the incoming inspection module 126. The process begins at 302 with the incoming inspection module 126 being initiated by, e.g., the vision base module 124, at 204 of FIG. 2. The work piece (for example a sewn product such as a piece of fabric or material) can be processed at 304 by the sewing robot 102 (FIG. 1) in which the work piece is moved into a work area such as the area of the sewing robot 102 where products are sewn together on a work table. The work piece can be moved by various fabric mover(s) 116 such as, e.g., actuators, budgers, end effectors, etc. In various implementations, the processing of the work piece can be monitored at 306 by various sensors (1-N) 122, which can collect sensor data on the work piece in order to complete the sewing process. For example, the sensors can capture data in which there is a piece of product that needs to be destacked and loaded onto the work table, at 304. The sensors 122 can capture data (e.g., a camera that captures a series of images) of the piece of the product on the work area, at 306.

The captured sensor data is then compared to a sensor profile 132, which can be precomputed, to determine if incoming inspection criteria are satisfied at 308. In some embodiments, the series of images captured from a camera can be compared to a size model of the sensor profile in which the length and width of the work piece are determined and placed into a rectangular template (e.g., bounding box). In other embodiments, the series of images captured from a camera can be compared to a curve model of the sensor profile in which the shape of the curves of the work piece is identified. In another embodiment, the series of images captured from a camera can be compared to an irregularities model of the sensor profile in which the irregularities of the work piece are identified, at 308.

Next at 310, the incoming inspection module 126 can apply the sensor profile(s) 132 to the system profile(s) 134 to determine if the incoming inspection criteria are satisfied. In some embodiments, the rectangular bounding box of the work piece can be compared to maximum and minimum template parameters for the robot system. In other embodiments, the curves identified on the work piece can be compared to a list of available curves for the robot system 102. In another embodiment, the irregularities identified on the work piece can be compared to a maximum limit of irregularities for the sewing robot 102, at 310.

It can then be determined at 312 if the process can proceed based upon the results of the sensor profile(s) 132 in comparison to the robot system profile(s) 134. In one implementation, if the rectangular template or bounding box identified in 308 exceeds the maximum template parameters or characteristics, or does not meet (or satisfy) the minimum template parameters or characteristics, of the robot system profile(s) 134, then the work piece is considered unacceptable and returns at 314 to the vision base module 124 (FIG. 2) where the result is considered to determine if the process can proceed at 206. In other implementations, if the identified curves of the work product are not supported by the model of the robot system profile 134, then the work piece is considered unacceptable and at 314 returns to the vision base module 124 (FIG. 2) at 206. In another implementation, if the identified irregularities are determined to be too great for the model of the robot system profile 134 to handle, then the work piece is considered unacceptable at 312 and returns at 314 to the vision base module 124 (FIG. 2) at 206 where the result is considered at 206. If it has been determined that the sensor profile(s) 132, when compared to the robot system profile(s) 134, is not adequate the process ends, at step 312. If the results of the comparison between the sensor profile(s) 132 and robot system profile(s) 134 is determined to be acceptable at 312, then the process returns at 314 to the vision base module 124 at 206.

Functioning of the inline process module 128 will now be explained with reference to FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
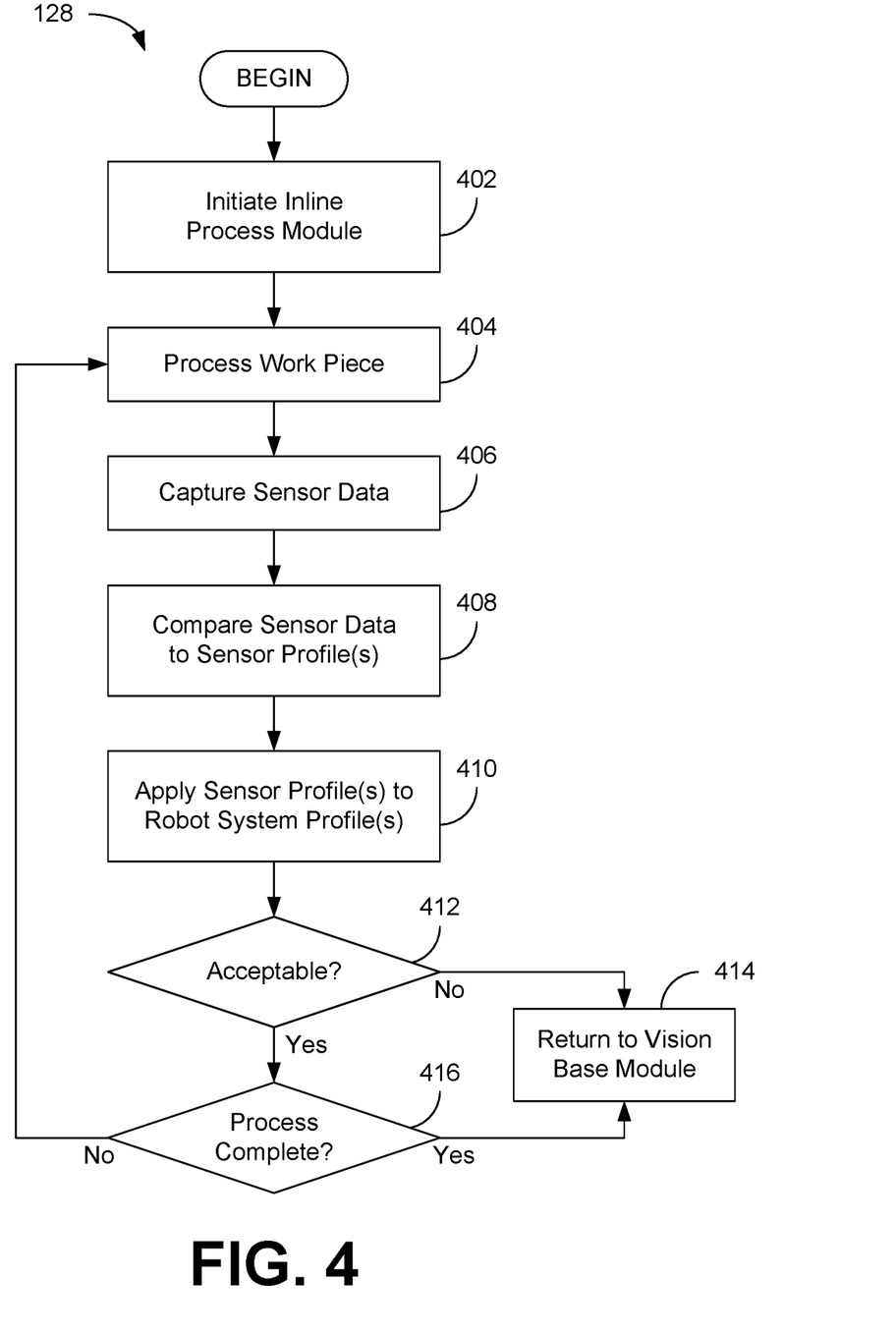
FIG. 4 illustrates an example of an inline process module, according to various embodiments of the present disclosure.

The flow chart of FIG. 4 shows the architecture, functionality, and operation of a possible implementation of the inline process module 128. The process begins at 402 with the inline process module 128 being initiated by, e.g., the vision base module 124 at 210 of FIG. 2. The work piece (for example a sewn product) can be processed at 404 by the sewing robot 102 in which the work piece is moved into the work area such as the area of the sewing robot 102 where products are sewn together on a work table. The work piece can be moved by various fabric mover(s) 116 such as, e.g., actuators, budgers, end effectors, etc. In some implementations, the processing of the work piece can be monitored at 406 by various sensors (1-N) 122 that can collect sensor data on the work piece in order to complete the sewing process, at 404. The sensors 122 can capture data (e.g., a camera that captures a series of images) of the piece of the product on the work area, at 406.

The captured sensor data can then be compared to a model of the sensor profile(s) 132 to determine if inline process criteria are satisfied at 408. In some embodiments, the series of images captured from a camera can be compared to an area model of sensor profile(s) 132 in which the area of the work piece is determined. In other embodiments, the series of images captured from the camera can be compared to a thread model of sensor in which the color of the thread or size of the thread is specified. In another embodiment, the series of images captured from the camera can be compared to a stitch type model of sensor profile(s) 132 in which the stitch type is specified, at 408.

Next at 410, the inline process module 128 can apply the sensor profile to the robot system profile 134 to determine if the inline process criteria are satisfied. In some embodiments, the area of the product can be compared to maximum and minimum area parameters or characteristics for the model of the robot system profile 134. In other embodiments, the color of the thread or size of the thread can be compared to the available thread capabilities of the model of the robot system profile 134. In another embodiment, the stitch type can be compared to the available stitch capabilities of the model of the robot system profile 134, at step 410.

It can then be determined at 412 if the process can proceed based upon the results of the sensor profile(s) 132 comparison to the robot system profile(s) 134. In some implementations, if the shape or area of the product, identified in 308 of FIG. 3, do not meet the parameters or characteristics of the robot system profile 134 (or the sensor profile 132), then the work piece can be considered unacceptable and returns at 414 to the vision base module 124 (FIG. 2) where the result is considered to determine if the process can proceed at 212. In other implementations, if the color or size of the thread of the product are not supported by the model of the robot system profile 134, then the work piece is unacceptable at 412 and the process returns at 414 to the vision base module 124. In another embodiment, if the stitch type is not supported by the model of the robot system profile 134, then the work piece is considered unacceptable at 412 and returns at 414 to the vision base module 124 (FIG. 2) at 212. If it is determined that the sensor profile(s) 132 comparison to the robot system profile(s) 134 is not adequate to fulfill the specified model characteristics, parameters and/or capabilities, then the flow returns to the vision base model 124 at 414.

If the results of the comparison between the sensor profile(s) 132 and robot system profile(s) 134 is determined to be acceptable at 412, then it is determined at 416 if the inline process is complete. For example, if the sewn product has completed the necessary sewing operations for the product fabrication. If the process is not complete at 416, then the process returns to 404 to continue processing the work piece. If the results of the comparison between the sensor profile(s) 132 and robot system profile(s) 134 is determined to be acceptable at 412 and the inline process 128 has been completed at 416, then the process returns to the vision base module 124 at 212.

Functioning of the quality inspection module 130 will now be explained with reference to FIG. 5. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
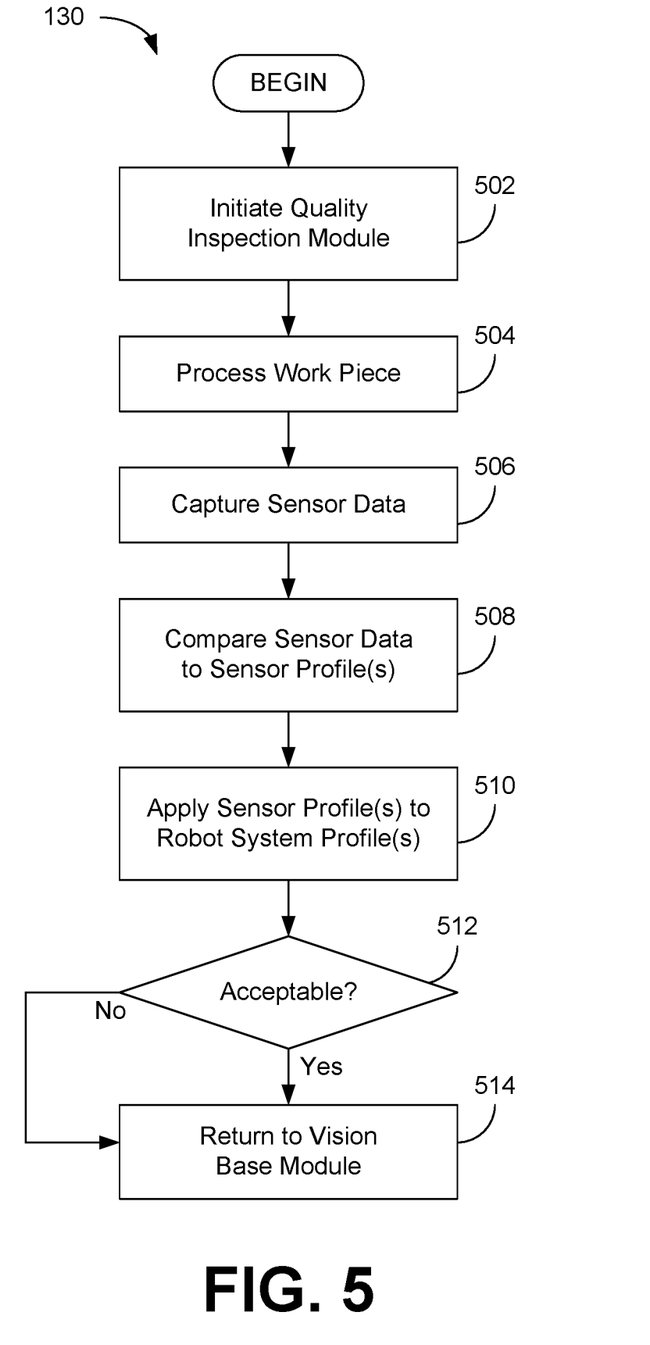
FIG. 5 illustrates an example of a quality inspection module, according to various embodiments of the present disclosure.

The flow chart of FIG. 5 shows the architecture, functionality, and operation of a possible implementation of the quality inspection module 130. The process begins at 502 with the quality inspection module 130 being initiated by the vision base module 124, at 214 of FIG. 2. The work piece (for example a sewn product) can be processed at 504 by the sewing robot 102 (FIG. 1) in which the work piece is moved in the work area such as the area of a sewing robot 102 where pieces of the product are sewn together on a work table. The work piece can be moved by various fabric mover(s) 116 such as, e.g., actuators, budgers, end effectors, etc. In various embodiments, the processing of the work piece can be monitored at 506 by various sensors (1-N) 122 that collect sensor data on the work piece in order to complete the sewing process. The sensors capture data (e.g., a camera that captures a series of images) of the piece of the product on the work area, at 506.

The captured sensor data can then be compared to a sensor profile 132 at 508 to determine if quality inspection criteria are satisfied. In some embodiments, the series of images captured from a camera can be compared to a sewn path model of the sensor profile(s) 132 in which the distance of the sewn path from the edge of the product is determined. In other embodiments, the series of images captured from a camera can be compared to a finished size model of the sensor profile(s) 132 in which the dimensions of the completed work piece are specified. In another embodiment, images captured from a camera can be used to determine if other features of the product have been constructed correctly, including the placement and attachment of other parts of the product, such as snaps, zippers, flaps, etc. Dimensions of the completed work piece can be determined from the captured images for comparison, at 508.

Next at 510, the quality inspection module 130 can apply the sensor profile 132 to the robot system profile 134 at 508 to determine if the quality inspection criteria are satisfied. In some embodiments, the distance of the sewn path from the edge of the sewn product can be compared to the sewn path parameters or characteristics for the robot system 102. In other embodiments, the dimensions of the completed work piece can be compared to the specified dimensions, parameters or characteristics of the finished size model for the robot system 102. In additional embodiments, while a sewn product is being processed, the sewing robot 102 can be actively gathering sensor data. This data may be used in a machine learning algorithm. The collected sensor data from the sewn product can be compared to previous sensor data of a high quality sewn product and of a poor quality sewn product, and the sewn product can be rated based on the comparison of the machine learning algorithm to determine if the quality of the sewn product meets a predetermined threshold, at step 510.

It can then be determined at 512 if the process can proceed based upon the results of the sensor profile(s) 132 comparison to the robot system profile(s) 134. In some implementations, if the distance of the sewn path from the edge of the product in 308 exceeds or does not meet (or satisfy) the sewn path parameters or characteristics of the robot system profile 134 at 512, then the product is considered unacceptable and returns at 514 to the vision base module 124 (FIG. 2) where the result is considered to determine if the process can proceed at 216. In other implementations, if the identified curves of the product are not supported by the model of robot system profile 134, the product can be considered unacceptable at 512, and returns at 514 to the vision base module 124. In another embodiment, if the dimensions of the completed work piece do not meet the dimensions, parameters or characteristics for a completed work piece, the product can be unacceptable and returns to the vision base module 124 at 514. If it is determined at 512 that the sensor profile 132 comparison to the robot system profile 134 is not adequate to fulfill the specified model characteristics, parameters and/or capabilities, then the flow returns to the vision base model 124 at 514. If the results of the comparison between the sensor profile 132 and robot system profile 134 are determined to be acceptable at 512, then the process returns at 514 to the vision base module 124 at 216 of FIG. 2, where the flow returns to 202 to detect the next incoming work piece.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system, comprising:
    a sewing robot comprising a work area;
    a sensor system configured to obtain images of at least a portion of the work area;
    a vision base module;
    a robot system profile and a sensor profile corresponding to a product capable of being fabricated by the sewing robot; and processing circuitry comprising a processor, wherein execution of the vision base module:
   detects that a work piece is present in the work area by the sensor system; and
   applies the sensor profile to the robot system profile.

2. The system of claim 1, wherein execution of the vision base module determines a position of the work piece based at least in part upon one or more incoming inspection images obtained of the work piece by the sensor system.

3. The system of claim 2, wherein the one or more incoming inspection images are compared to a size model of the sensor profile, compared to a curve model of the sensor profile, or compared to an irregularities model of the sensor profile.

4. The system of claim 3, wherein one or more dimension of the work piece is determined from the one or more incoming inspection images and compared to a bounding template of the size model, and applying the sensor profile to the robot system profile comprises comparing the bounding template to maximum and minimum template parameters for the sewing robot.

5. The system of claim 3, wherein at least one curve of the work piece is identified based upon a comparison of shapes of the curve model with the work piece in the one or more incoming inspection images, and applying the sensor profile to the robot system profile comprises comparing the at least one curve identified on the work piece to a list of available curves for the sewing robot.

6. The system of claim 3, wherein at least one irregularity of the work piece is identified based upon a comparison of the irregularities model with the work piece in the one or more incoming inspection images, and applying the sensor profile to the robot system profile comprises comparing the at least one irregularity identified on the work piece to a defined irregularity limit for the sewing robot.

7. The system of claim 1, wherein execution of the vision base module tracks processing of the work piece based at least in part upon one or more inline process images obtained of the work piece by the sensor system.

8. The system of claim 7, wherein the one or more inline process images are compared to a curve model of the sensor profile or compared to a stitch type model of the sensor profile.

9. The system of claim 8, wherein a shape of the work piece is tracked based upon the one or more inline process images and the curve model, and applying the sensor profile to the robot system profile comprises comparing the shape of the work piece to specified parameters for the sewing robot.

10. The system of claim 8, wherein stitching of the work piece is tracked based upon a comparison of the stitch type model with the work piece in the one or more inline process images, and applying the sensor profile to the robot system profile comprises comparing the stitching to available stitch capabilities for the sewing robot.

11. The system of claim 7, wherein the one or more inline process images are captured by the sensor system during processing of the work piece by the sewing robot.

12. The system of claim 7, wherein a corrective action is initiated in response to processing of the work piece not being acceptable.

13. The system of claim 12, wherein operation of the sewing robot is adjusted to maintain processing of the work piece within production tolerances.

14. The system of claim 12, wherein the corrective action comprises removing the work piece from the sewing robot.

15. The system of claim 1, wherein execution of the vision base module verifies quality of a work product resulting from processing of the work piece, where the quality is based at least in part upon one or more quality inspection images obtained of the work piece by the sensor system.

16. The system of claim 15, wherein the one or more quality inspection images are compared to a sewn path model of the sensor profile or compared to a finished size model of the sensor profile.

17. The system of claim 16, wherein a sewn path of the work product is determined with respect to sewn path parameters from the one or more quality inspection images and the sewn model.

18. The system of claim 17, wherein verifying the quality of the work product comprises comparing a distance of the sewn path to a defined sewn path limit for the sewing robot.

19. The system of claim 16, wherein at least one dimension of the work product is identified based upon a comparison of the finished size model with the one or more quality inspection images.

20. The system of claim 19, wherein verifying the quality of the work product comprises comparing the at least one dimension to defined dimension limits for the sewing robot.

* * * * *